(12) United States Patent
Zou et al.

(10) Patent No.: US 10,893,183 B1
(45) Date of Patent: Jan. 12, 2021

(54) ON-VEHICLE IMAGING SYSTEM

(71) Applicant: GM GLOBAL TECHNOLOGY OPERATIONS LLC, Detroit, MI (US)

(72) Inventors: Guangyu J. Zou, Warren, MI (US); Shuqing Zeng, Sterling Heights, MI (US); Upali P. Mudalige, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/686,407

(22) Filed: Nov. 18, 2019

(51) Int. Cl.
*H04N 5/225* (2006.01)
*B60R 11/04* (2006.01)
*G01S 17/931* (2020.01)

(52) U.S. Cl.
CPC ............ *H04N 5/2259* (2013.01); *B60R 11/04* (2013.01); *G01S 17/931* (2020.01); *H04N 5/2254* (2013.01)

(58) Field of Classification Search
CPC .. H04N 5/2259; H04N 5/2254; G01S 17/931; B60R 11/04
USPC ......................................................... 348/148
See application file for complete search history.

(56) References Cited

U.S. PATENT DOCUMENTS

| | | | |
|---|---|---|---|
| 2007/0253057 A1* | 11/2007 | Potsaid ................ | G02B 21/002 359/384 |
| 2016/0078298 A1* | 3/2016 | Wu ..................... | H04N 5/23216 348/143 |
| 2019/0212418 A1 | 7/2019 | Lee et al. | |
| 2019/0306406 A1 | 10/2019 | Kosaka | |
| 2019/0311209 A1* | 10/2019 | Ducote ................ | G06K 9/3233 |
| 2019/0312999 A1 | 10/2019 | Kurioka et al. | |

OTHER PUBLICATIONS

Jia Shiun Lu, Guo-Dung J. Su, Optical Zoom Lens Module Using MEMS Deformable Mirrors for Portable Device, Article Proc. SPIE 8488, Zoom Lenses IV, 8488D (Oct. 24, 2012); https://doi.org/10.1117/12.929621.

* cited by examiner

*Primary Examiner* — Michael Lee
(74) *Attorney, Agent, or Firm* — Quinn IP Law (57) ABSTRACT

An attention-based imaging system is described, including a camera that can adjust its field of view (FOV) and resolution and a control routine that can determine one or more regions of interest (ROI) within the FOV to prioritize camera resources. The camera includes an image sensor, an internal lens, a steerable mirror, an external lens, and a controller. The external lens is disposed to monitor a viewable region, and the steerable mirror is interposed between the internal lenses and the external lenses. The steerable mirrors are arranged to project the viewable region from the external lens onto the image sensor via the internal lens. The steerable mirror modifies the viewable region that is projected onto the image sensor and controls the image sensor to capture an image. The associated control routine can be deployed either inside the camera or in a separate external processor.

18 Claims, 5 Drawing Sheets

ON-VEHICLE IMAGING SYSTEM

INTRODUCTION

Vehicles employ cameras and other sensing and perception devices to monitor surroundings, including other vehicles, pedestrians, traffic signals, buildings, road signs, etc. that surround the vehicle and may be in a desired trajectory of the vehicle. Much of the information contained in a viewable region of a camera may be extraneous in that it may not be relevant for purposes of controlling vehicle operation in a travel path. Data transfer from cameras and other sensing devices and associated latencies may reduce system performance or increase a need for processing capability. Effects of latencies and a need for processing capability may become more pronounced with implementation of higher definition cameras and other sensing devices. As such, there may be a benefit to focusing on-vehicle sensing and processing resources on portions of a viewable region that are associated with a travel path associated with a desired trajectory of the vehicle. Therefore, there is a need to identify portions of a viewable region that may be of interest, and to control operation of the cameras and other sensing and perception devices to concentrate thereon.

SUMMARY

A system, device, and method are described herein related to identifying portions of a viewable region that may be of interest, controlling operation of a camera and other sensing devices to concentrate thereon to capture images and other data modalities, analyzing the captured images and other modalities, and controlling operation based thereon. This includes an attention-based imaging system that includes a camera that can dynamically adjust its field of view (FOV) and resolution, and a control routine that can determine one or a plurality of regions of interest (ROI) within the FOV and enable the camera to prioritize its resources to those ROIs.

One aspect of the disclosure includes a camera that includes an image sensor, one or multiple internal lenses, one or multiple steerable mirrors, and one or more external lenses, and a controller. The controller is operatively connected to the image sensor and the steerable mirror. The external lens is disposed to monitor a viewable region, and the steerable mirror is interposed between the internal lenses and the external lenses. The steerable mirrors are arranged to project the viewable region from the external lens onto the image sensor via the internal lens. The controller is arranged to control the steerable mirror to modify the viewable region that is projected onto the image sensor via the internal lens, and also arranged to control the image sensor to capture an image of a field of view (FOV) that is associated with the viewable region that is projected onto the image sensor via the internal lens.

An aspect of the disclosure includes the controller being arranged to control the steerable mirror to project a portion of the viewable region onto the entire image sensor.

Another aspect of the disclosure includes the steerable mirror being a MEMS mirror.

Another aspect of the disclosure includes the controller being arranged to control the steerable mirror to tilt the viewable region that is projected onto the image sensor.

Another aspect of the disclosure includes controller being arranged to control the steerable mirror to pan the viewable region that is projected onto the image sensor.

Another aspect of the disclosure includes the steerable mirror being controllably deformable.

Another aspect of the disclosure includes the controller being arranged to deform the steerable mirror to zoom a portion of the viewable region that is projected onto the image sensor.

Another aspect of the disclosure includes the controller being operatively connected to the internal lens, wherein the controller is arranged to control the steerable mirror and the internal lens to modify the viewable region that is projected onto the image sensor.

Another aspect of the disclosure includes the camera being disposed on a vehicle, wherein the external lens is disposed to view a region surrounding the vehicle that is associated with a direction of travel of the vehicle.

Another aspect of the disclosure includes an image processing device that includes an image sensor, an internal lens, a steerable mirror, an external lens, a lidar device, and a controller. The lidar device includes a laser transmitter and a receiver, and the laser transmitter is arranged to project a laser beam onto the steerable mirror. The controller is operatively connected to the image sensor, the lidar device, and the steerable mirror. The external lens is disposed to monitor a viewable region. The steerable mirror is interposed between the internal lens and the external lens, and is arranged to project the viewable region from the external lens onto the image sensor via the internal lens. The controller is arranged to control the steerable mirror to a first setting to project the viewable region onto the image sensor, and control the image sensor to capture an image file of a field of view (FOV) that is associated with the viewable region that is projected onto the image sensor via the internal lens. The controller is also arranged to control the steerable mirror to a second setting, activate the laser transmitter to project the laser beam into the viewable region via the steerable mirror, and capture via the receiver a reflected image of the laser beam associated with the viewable region via the steerable mirror.

Another aspect of the disclosure includes the controller being arranged to control the steerable mirror to project the laser beam into a portion of the viewable region and capture the reflected image of the laser beam at the laser receiver.

Another aspect of the disclosure includes the laser transmitter and the image sensor sharing a common optical outlet path for monitoring the view region that is defined by the steerable mirror and the external lens.

Another aspect of the disclosure includes the controller multiplexing the use of the optical outlet path between the image sensor and the lidar device.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" refers to mechanical and electrical hardware, software, firmware, electronic control components, processing logic, and/or processor devices, individually or in combination, that provide the described functionality. This may include, without limitation, an application specific integrated circuit (ASIC), an electronic circuit, a processor (shared, dedicated, or group) that executes one or more software or firmware programs, memory device (s) containing software or firmware instructions, a combinational logic circuit, and/or other components.

For the sake of brevity, some components and techniques understood in the art, and other functional aspects of the systems, and the individual operating components of the systems, may not be described in detail herein. Furthermore, the connecting lines shown in the various figures contained herein are intended to represent example functional relationships and/or physical couplings between the various elements. Many alternative or additional functional relationships or physical connections may be present in an embodiment of the disclosure.

Figure 1:
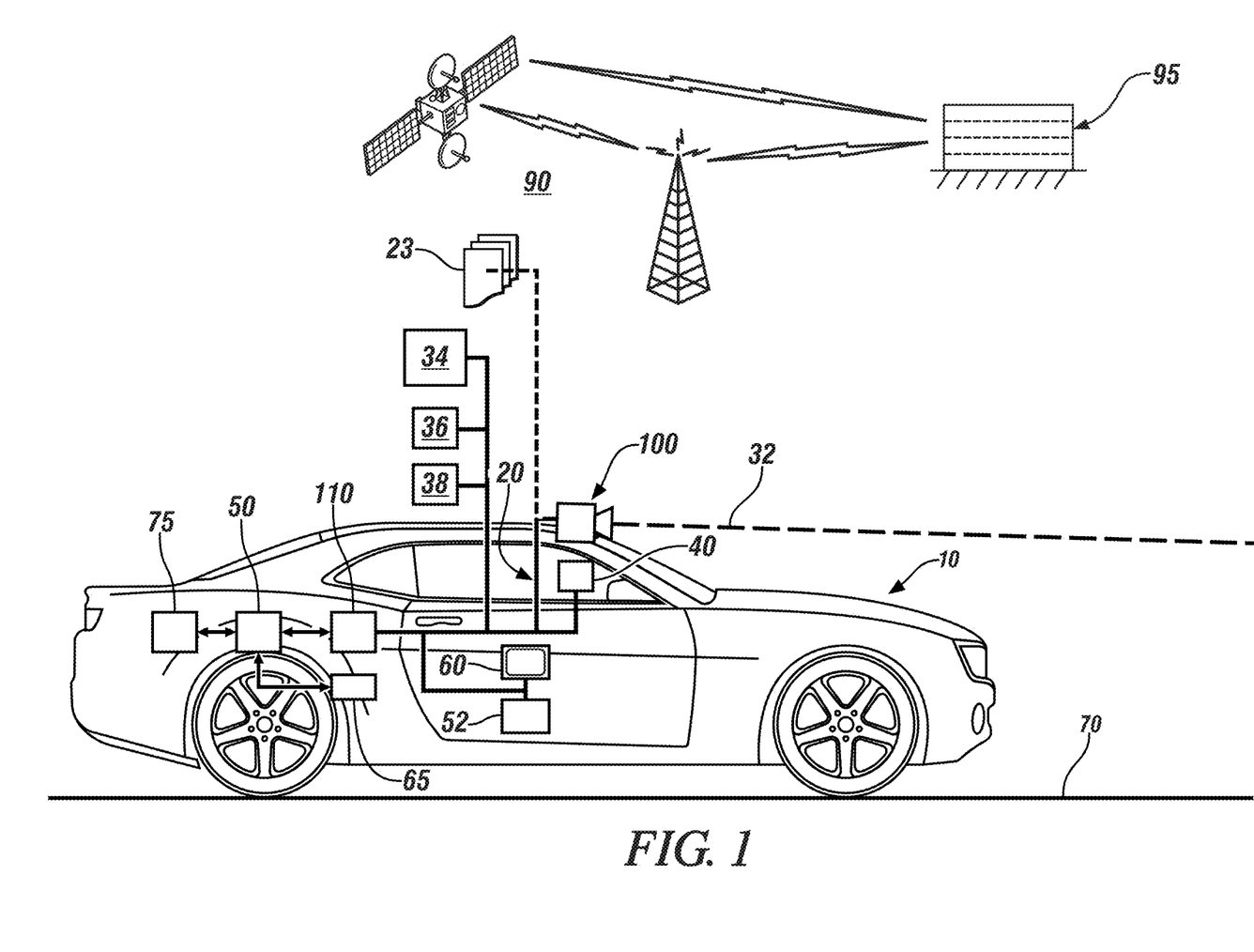
FIG. 1 schematically illustrates a side-view of a vehicle including an on-vehicle imaging system, in accordance with the disclosure.

Referring to the drawings, wherein like reference numerals correspond to like or similar components throughout the several Figures, FIG. 1, consistent with embodiments disclosed herein, schematically illustrates a side-view of a vehicle 10 including an on-vehicle imaging system 20. In one embodiment the vehicle 10 is disposed on and able to traverse a travel surface 70 such as a paved road surface. The vehicle 10 also includes a vehicle controller 50, a human/machine interface (HMI) device 60, and in one embodiment an autonomous controller 65 and a telematics controller 75. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment, the imaging system 20 includes one or a plurality of sensors that is arranged to monitor the viewable region 32 surrounding the vehicle 10 including, e.g., that portion which is forward of the vehicle 10, and an imaging controller 40. The sensors that are arranged to monitor the viewable region 32 surrounding the vehicle 10 including, e.g., that portion which is forward of the vehicle 10 include, e.g., a camera 100, a lidar sensor 34, a radar sensor 36, a perception sensor 38, e.g., a second camera, etc. "Lidar" means Light Detection and Ranging, and the lidar sensor 34 is an element of a sensing system that employs a pulsed and reflected laser beam to measure range or distance to an object. "Radar" means Radio Detection and Ranging, and the radar sensor 36 is an element of a sensing system that employs radio waves to determine range, angle, and/or velocity of an object. Embodiments of the camera 100 are described with reference to FIGS. 5, 6, and 7, include an internal lens group 104 and an image sensor 102 that is capable of capturing, processing and electronically storing image files of the associated viewable region 32, and communicating the image files to a camera controller 110 for storage and analysis.

The camera 100 is advantageously mounted and positioned on the vehicle 10 in a location that permits capturing images of the viewable region 32, wherein at least a portion of the viewable region 32 includes a portion of the travel surface 70 that is forward of the vehicle 10 and includes a trajectory of the vehicle 10. The viewable region 32 may also include a surrounding environment, including, e.g., vehicle traffic, roadside objects, pedestrians, and other features, the sky, a horizon, the lane of travel and on-coming traffic forward of the vehicle 10. Other cameras (not shown) may also be employed, including, e.g., a second camera that is disposed on a rear portion or a side portion of the vehicle 10 to monitor rearward of the vehicle 10 one of the right or left sides of the vehicle 10.

The vehicle 10 may be equipped with an autonomous controller 65 that implements autonomous or advanced driver assistance system (ADAS) vehicle functionalities. Autonomous vehicle functionality may include an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operations. Driving automation can include some level of automatic control or intervention related to a single vehicle function, such as steering, acceleration, and/or braking, with the driver continuously having overall control of the vehicle 10. Driving automation can include some level of automatic control or intervention related to simultaneous control of multiple vehicle functions, such as steering, acceleration, and/or braking, with the driver continuously having overall control of the vehicle 10. Driving automation can include simultaneous automatic control of vehicle driving functions that include steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle 10 for an entire trip. Driving automation includes hardware and controllers configured to monitor the spatial environment under various driving modes to perform various driving tasks during dynamic vehicle operation. Driving automation can include, by way of non-limiting examples, cruise control, adaptive cruise control, lane-change warning, intervention and control, automatic parking, acceleration, braking, and the like. The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. As such, the braking command can be generated by the autonomous controller 65 independently from an action by the vehicle operator and in response to an autonomous control function.

Operator controls can be included in the passenger compartment of the vehicle 10 and may include, by way of non-limiting examples, a steering wheel, an accelerator pedal, the brake pedal and an operator input device. The operator controls enable a vehicle operator to interact with and direct operation of the vehicle 10 in functioning to provide passenger transportation.

The HMI device 60 provides for human/machine interaction, for purposes of directing operation of an infotainment system, a global position sensor (GPS) 52, a navigation system and the like, and includes a controller. The HMI device 60 monitors operator requests and provides information to the operator including status of vehicle systems, service and maintenance information. The HMI device 60 communicates with and/or controls operation of a plurality of operator interface devices, wherein the operator interface devices are capable of transmitting a message associated with operation of one of the autonomic vehicle control systems. The HMI device 60 may also communicate with one or more devices that monitor biometric data associated with the vehicle operator, including, e.g., eye gaze location, posture, and head position tracking, among others. The HMI device 60 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI device 60. The HUD may project information that is reflected onto an interior side of a windshield of the vehicle, in the field-of-view of the operator, including transmitting a confidence level associated with operating one of the autonomic vehicle control systems. The HUD may also provide augmented reality information, such as lane location, vehicle path, directional and/or navigational information, and the like.

The vehicle 10 may include a telematics controller 75, which includes a wireless telematics communication system capable of extra-vehicle communications, including communicating with a communication network 90 having wireless and wired communication capabilities. The telematics controller 75 is capable of extra-vehicle communications that includes short-range vehicle-to-vehicle (V2V) communication and/or vehicle-to-infrastructure (V2x) communication, which may include communication with an infrastructure monitor, e.g., a traffic camera. Alternatively or in addition, the telematics controller 75 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller 75, and the handheld device executes the extra-vehicle communication, including communicating with an off-board server 95 via the communication network 90. Alternatively or in addition, the telematics controller 75 executes the extra-vehicle communication directly by communicating with the off-board server 95 via the communication network 90.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
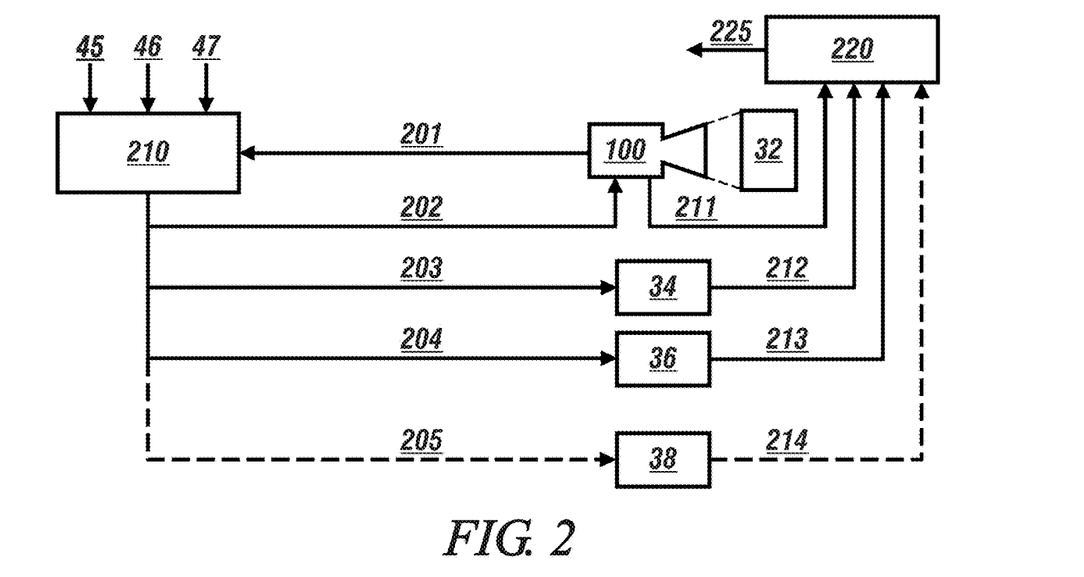
FIG. 2 schematically illustrates a sensor interface diagram indicating signal transmissions between a camera, a lidar sensor, a radar sensor, another perception sensor, a high-resolution data processor, and an attention processor, in accordance with the disclosure.

FIG. 2 schematically illustrates a sensor interface diagram 200 associated with the imaging system 20, indicating signal transmission paths between the camera 100, the lidar sensor 34, the radar sensor 36, the perception sensor 38 (when employed), a high-resolution data processor 220, and an attention generation processor 210. The high-resolution data processor 220 and the attention generation processor 210 may be elements of the imaging controller 40 described with reference to FIG. 1, or may be stand-alone devices that communicate with the imaging controller 40 to coordinate signal transmission between the camera 100, the lidar sensor 34, the radar sensor 36, the other perception sensor 38, the high-resolution data processor 220, and the attention generation processor 210. The camera 100 is capable of capturing a low-resolution digital image 201 of the entire viewable region 32, which is communicated to the attention generation processor 210. Other inputs to the attention generation processor 210 include a gaze map 45, a digital map 46 and associated GPS signal, and vehicle maneuvering inputs 47 that are captured from vehicle steering, braking and acceleration systems. The attention generation processor 210 executes a control routine 300, which determines one or a plurality of camera control signals 202, one or a plurality of lidar control signals 203, one or a plurality of radar control signals 204, and one or a plurality of control signals 205 for the perception sensor 38. Details of the control routine 300 are described with reference to FIG. 3.

The camera control signals 202 focus operation of the camera 100 to capture an image 211 of one or a plurality of regions of interest (ROIs) in the viewable region 32. The lidar control signals 203 command operation of the lidar sensor 34 to capture a lidar signal 212 associated with one or a plurality of regions of interest (ROIs) in the viewable region 32. The radar control signals 204 command operation of the radar sensor 36 to capture a radar signal 213 associated with one or a plurality of regions of interest (ROIs) in the viewable region 32. The one or a plurality of control signals 205 command operation of the perception sensor 38 to capture a perception signal 214 associated with one or a plurality of regions of interest (ROIs) in the viewable region 32.

The image 211, the lidar signal 212, the radar signal 213, and the perception signal 214 are input to the high-resolution data processor 220, which generates a set of heterogeneous, high-resolution, multi-modal sensory data 225 for the driving environment perception, which may be employed by the autonomous controller 65 and associated ADAS that are described with reference to FIG. 1. Such operation can be employed to improve data transfer of high-resolution images from the camera 100 and the lidar sensor 34.

Figure 3:
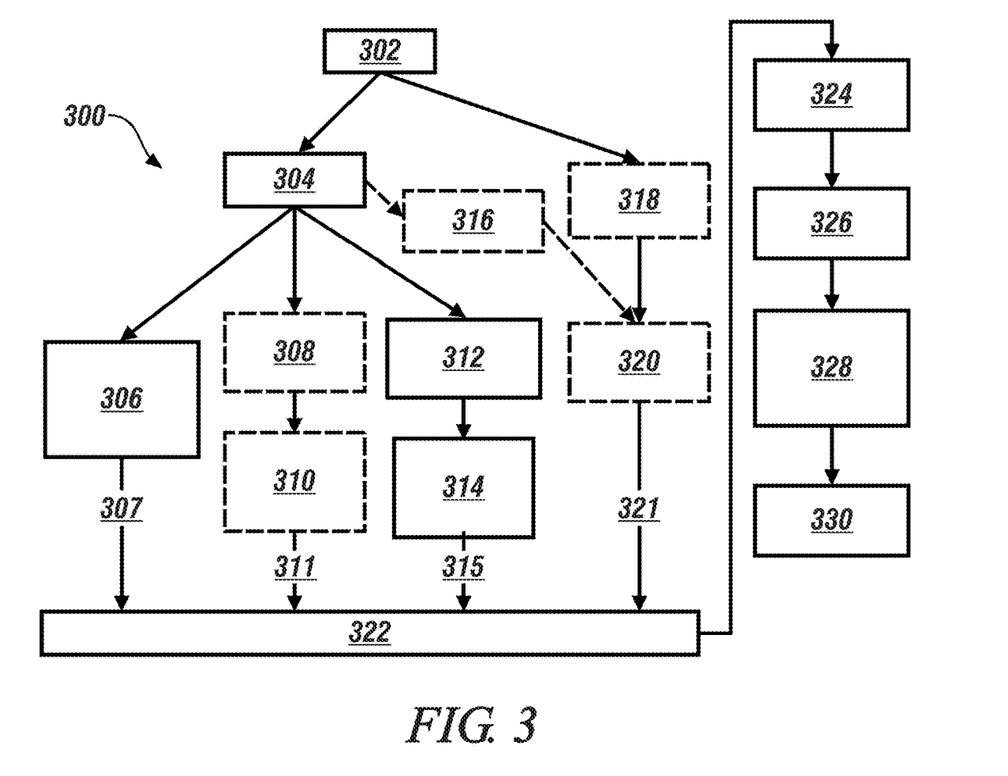
FIG. 3 schematically illustrates a routine in the form of a flowchart for controlling operation of an imaging system to extract information from a viewable region of a camera, in accordance with the disclosure.

FIG. 3 schematically illustrates an embodiment of the control routine 300 in the form of a flowchart for controlling operation of the imaging system 20 that is described with reference to FIG. 1 to extract information from the viewable region 32 of the camera 100 that is forward of the vehicle 10 for purposes of conveying information to a vehicle operator and controlling operation of the vehicle 10. The control routine 300 is illustrated as a collection of blocks in a logical flow graph, which represent a sequence of operations that can be implemented in hardware, software, or a combination thereof. In the context of software, the blocks represent computer instructions that, when executed by one or more processors, perform the recited operations. For convenience and clarity of illustration, the control routine 300 is described with reference to the vehicle 10 that is shown in FIG. 1.

TABLE 1

| BLOCK | BLOCK CONTENTS |
|---|---|
| 302 | Initiate execution |
| 304 | Capture image file of entire viewable region |
| 306 | Generate first set of regions of interest (ROI) |
| 308 | Acquire range image from lidar, radar sensors |
| 310 | Generate second set of ROIs |
| 312 | Perceive travel path features and structures |
| 314 | Generate third set of ROIs |
| 316 | Determine motion map based upon consecutive image frames |
| 318 | determine motion map based upon inputs from other sensors |
| 320 | Generate fourth set of ROIs |
| 322 | Consolidate and first, second, third, fourth set of ROIs |
| 324 | Select ROIs based upon ranking |
| 326 | Convey information to imaging controller |
| 328 | Capture HD images in selected ROIs |
| 330 | Downstream data processing |

Execution of the control routine 300 may proceed as follows. The steps of the control routine 300 may be executed in order but are not limited to the order described with reference to FIG. 3. As employed herein, the term "1" indicates an answer in the affirmative, or "YES", and the term "0" indicates an answer in the negative, or "NO". The control routine 300 initiates (302) by controlling the camera 100 to capture one or a plurality of image files 23 associated with the viewable region 32 forward of the vehicle 10, at a pre-defined default resolution of the camera 100, which can be adjusted for the optimal performance of the system. A first set of regions of interest (ROIs) 307 of the viewable region 32 captured in the image file is generated (306). The first set of ROIs 307 is determined based upon a confidence threshold associated with each of the detectors or the disagreements of multiple detectors, e.g., the disagreement between object detection and semantic segmentation.

A second set of ROIs 311 may be determined, based upon comparisons across different sensory modalities, such as image file 23, inputs from the lidar sensor 34, the radar sensor 36, and the perception sensor 38 (when employed) (308). This includes identifying the second set of ROIs 311 as that portion of the viewable region 32 that indicates a disagreement between the image file 23 and one or more of the inputs from the lidar sensor 34, the radar sensor 36, and the perception sensor 38 (310). As such, a disagreement between the image file 23 and one or more of the inputs from the lidar sensor 34, the radar sensor 36, and the perception sensor 38 may indicate to the camera controller 110 that there is a need for a concentrated review of that portion of the viewable region 32 that indicates a disagreement amongst the image file 23 and one or more of the inputs from the lidar sensor 34, the radar sensor 36, and the perception sensor 38.

A third set of ROIs 315 is determined based upon a perception and evaluation of the travel path and surrounding structures, which may be combined with information from a digital map and/or a prediction of a direction of the vehicle operator's gaze (312). The third set of ROIs 315 is selected based upon the perception and evaluation of the travel path and surrounding structures in context of an expected travel path of the vehicle 10 and an expected maneuver of the vehicle 10 (314). As such, either the image file 23 or the expected travel path of the vehicle 10 or the expected maneuver of the vehicle 10 or additional information from a digital map may indicate to the camera controller 110 that there is a need for a concentrated review of certain portions of the viewable region 32 that may contain information that is relevant to the present driving environment.

A fourth set of ROIs 321 may be determined based upon motion of the vehicle 10 and motion of surrounding vehicles, pedestrians, etc. that may be in the travel path of the vehicle 10. This may include determining a motion map for the viewable region 32 based upon evaluation of consecutively acquired image frames (316), or from other sensing devices (where employed) (318). The fourth set of ROIs 321 are selected based upon detection and isolation of motion in a portion of the viewable region 32 using the motion maps (320). As such, motion of the vehicle 10 or motion of surrounding vehicles, pedestrians, etc. that may be in the travel path of the vehicle 10 may indicate to the camera controller 110 that there is a need for a concentrated review of that portion of the viewable region 32 that indicates potential risks.

The first set of ROIs 307, second set of ROIs 311, third set of ROIs 315 and fourth set of ROIs 321 are consolidated in context of portions or subsets of the viewable region, and are ranked in terms of urgency, wherein urgency is determined based upon the relevance of each of the aforementioned ROIs in context of an expected maneuver of the vehicle 10 and a risk level for the vehicle 10 (322). The risk level for the vehicle 10 is associated with an estimation of a need to execute a driving maneuver, such as braking at an intersection in response to a stop light.

One or more of the first set of ROIs 307, second set of ROIs 311, third set of ROIs 315 and fourth set of ROIs 321 are selected based upon the ranking (324), and this information is conveyed to the imaging controller 40 (326), which controls operation of the camera 100 based thereon (328) for downstream system modules. This may include scene semantic parsing, automatic focusing, optical and/or digital zooming, high-resolution and/or low-resolution sensory data capture, finer object state estimation, finer object classification, and controlling operation based thereon (330). Controlling operation of the camera 100 also includes controlling pan, tilt and zoom functions of the camera 100, as described with reference to FIGS. 5 and 7.

Figure 4:
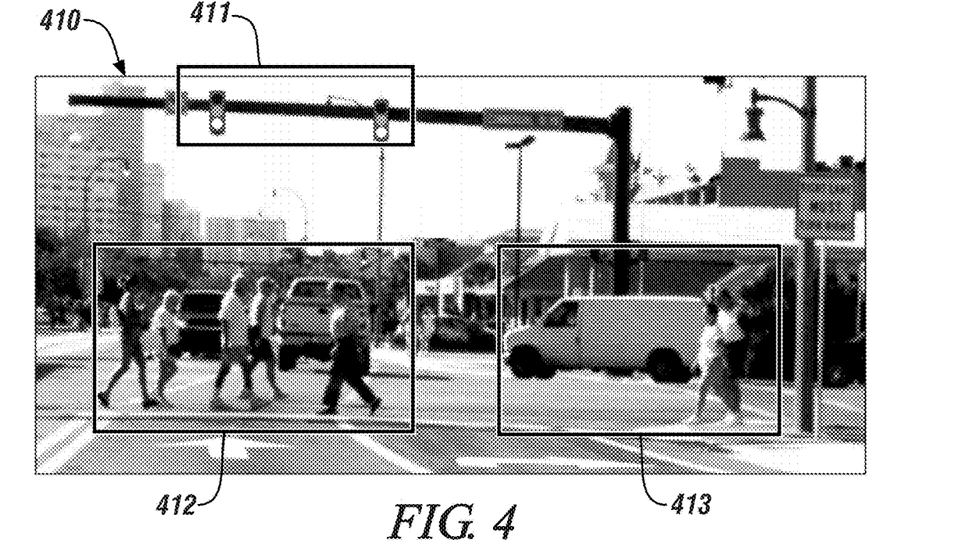
FIG. 4 pictorially illustrates an example of an image file associated with a viewable region at the original resolution of the camera, in accordance with the disclosure.

FIG. 4 pictorially illustrates an example of an image file associated with a viewable region 410 forward of an embodiment of the vehicle 10 at the initial default resolution of the camera 100 in the background and native high resolution in the ROIs. ROIs are identified in accordance with execution of the control routine 300 for controlling operation of and embodiment of the imaging system 20 that is described with reference to FIG. 1. This includes a first ROI 411 associated with a fixture, including, e.g., a traffic light, a second ROI 412 associated with longitudinal traffic, e.g., pedestrians in a crosswalk, and a third ROI 413 associated with cross traffic, e.g., a vehicle at an intersection.

Figure 5:
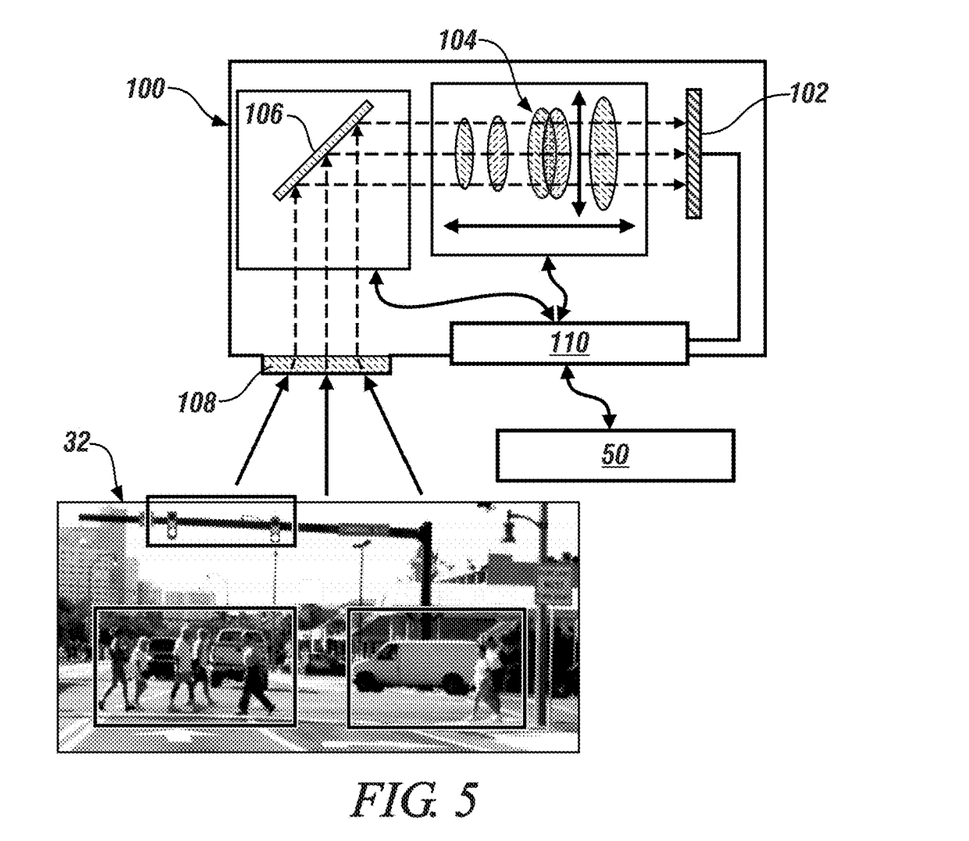
FIG. 5 schematically illustrates an embodiment of a camera of an imaging system, including an image sensor, internal lens groups, steerable mirror, external lens, and camera controller, in accordance with the disclosure.
Figure 6A:
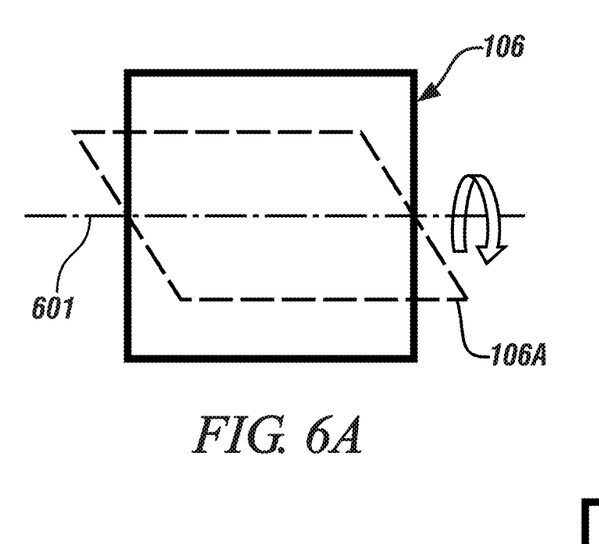
FIGS. 6A, 6B, and 6C schematically show horizontal tilting of the viewable region, vertical tilting of the viewable region, and panning of the viewable region, respectively, of the camera, in accordance with the disclosure.
Figure 6B:
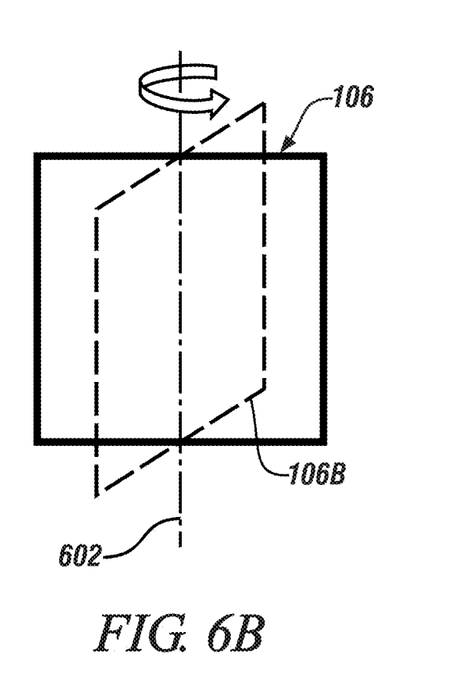
Figure 6C:
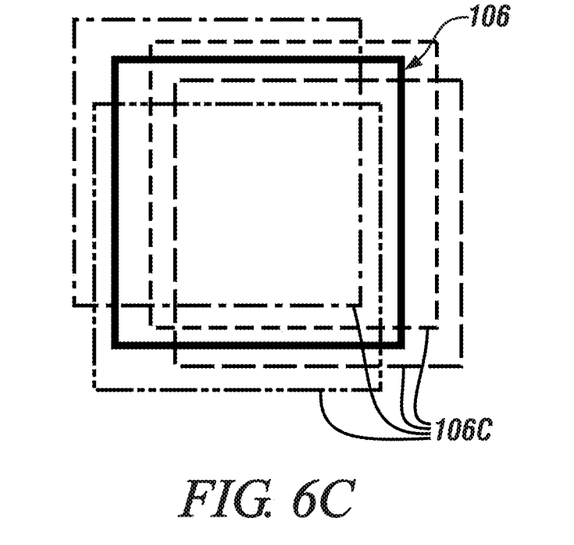

FIG. 5 schematically illustrates one embodiment of the camera 100 that is an element of the imaging system 20 that is described with reference to FIG. 1. The camera 100 includes the image sensor 102, the internal lens group 104, a steerable mirror 106, an external lens 108, and camera controller 110. The camera controller 110 is operatively connected to the image sensor 102 and the steerable mirror 106, and the external lens 108 is disposed to monitor a viewable region, which is shown as viewable region 410 for purposes of illustration.

The image sensor 102 is an electro-optical device that converts an optical image into an electronic signal employing a multi-dimensional array of light-sensitive sensing elements. The steerable mirror 106 is interposed between the internal lens group 104 and the external lens 108, and is arranged to project the viewable region 32, or a portion thereof, from the external lens 108 onto the image sensor 102 via the internal lens group 104. The camera controller 110 is arranged to control the steerable mirror 106 to modify the viewable region 410 that is projected onto the image sensor 102 via the internal lens group 104. The camera controller 110 is arranged to control the image sensor 102 to capture an image of a field of view (FOV) that is associated with the viewable region 410 that is projected onto the image sensor 102 via the internal lens group 104.

In one embodiment, the steerable mirror 106 is in the form of a micro-electromechanical system (MEMS) mirror, or a micro-opto-electromechanical system (MOEMS) mirror which employs optical beam steering or optical scanning technology that is capable of steering, modulating or otherwise controlling light. In one embodiment, the camera controller 110 is arranged to control the steerable mirror 106 to tilt the viewable region 410 that is projected onto the image sensor 102. This includes the steerable mirror 106 being controllable to a second position 106A to tilt the viewable region 410 in relation to a horizontal axis for projection onto the image sensor 102 in one embodiment. Tilting the viewable region 410 that is projected onto the image sensor 102 in relation to a horizontal axis 601 is illustrated with reference to FIG. 6A. This includes the steerable mirror 106 being controllable to a second position 106B to tilt the viewable region 410 in relation to a vertical axis for projection onto the image sensor 102 in one embodiment. Tilting the viewable region 410 that is projected onto the image sensor 102 in relation to a vertical axis 602 is illustrated with reference to FIG. 6B. In one embodiment, the camera controller 110 is arranged to control the steerable mirror 106 to pan the viewable region 410 that is projected onto the image sensor 102. Panning the viewable region 410 that is projected onto the image sensor 102 is illustrated by elements 106C, which are shown with reference to FIG. 6C. Panning effect may also be implemented by a piston movement of the mirror. Panning is a photographic technique that provides horizontal (or vertical) movement of the camera as it scans a moving object to keep the moving object in focus while minimizing or otherwise blurring the background. In one embodiment, the steerable mirror 106 may be controllably deformable about a vertical axis, a horizontal axis or a centroid point. The camera controller 110 is arranged to deform the steerable mirror to zoom or magnify a portion of the viewable region 410 that is projected onto the image sensor 102.

The internal lens group 104 and external lens 108 may be configured to include features such as voice coil actuated lens, MEMS actuated lens, deformable liquid crystal lens, a pin-hole lens, a fisheye lens, a stereo lens, a telescopic lens, etc.

The camera 100 periodically captures, via the image sensor 102. an image file 23 associated with the viewable region 410 at a desired rate, e.g., 30 image files per second. Each image file 23 is composed as a pixelated digital representation of all or a portion of the viewable region 410 that is captured at an original resolution of the camera 100. In one embodiment, the image file 23 is in the form of a 24-bit image including RGB (red-green-blue) visible light spectrum values and depth values that represent the viewable region 410. Other embodiments of the image file 23 can include either an image at some level of resolution depicting a black-and-white or a grayscale visible light spectrum representation of the viewable region 410, an infrared spectrum representation of the viewable region 410, or other image representations without limitation. The image representations of the plurality of image files 23 can be evaluated for parameters related to brightness and/or luminance in one embodiment. Alternatively, the image representations may be evaluated based upon RGB color components, brightness, texture, contour, or combinations thereof. The image sensor communicates with an encoder, which executes digital signal processing (DSP) on each image file. The image sensor 102 of the camera 100 may be configured to capture the image at a nominally standard-definition resolution, e.g., 640×480 pixels. Alternatively, the image sensor of the camera 100 may be configured to capture the image at a nominally high-definition resolution, e.g., 1440×1024 pixels, or at another suitable resolution. The image sensor of the camera 100 may capture still images, or alternatively, digital video images at a predetermined rate of image capture. The image files 23 are communicated to the camera controller 110 as encoded datafiles that are stored in a non-transitory digital data storage medium in one embodiment for on-board or off-board analysis.

Figure 7:
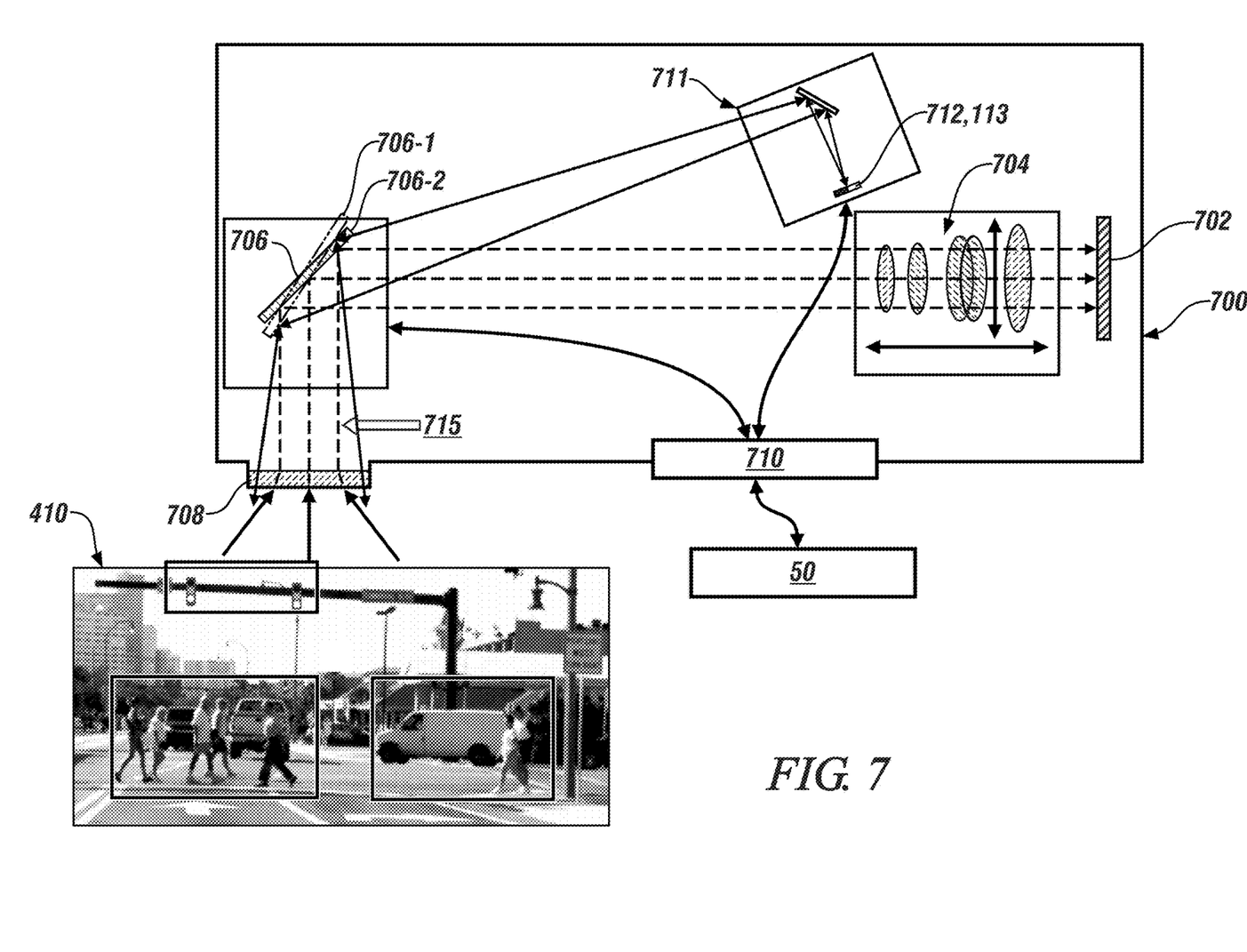
FIG. 7 schematically illustrates an embodiment of a camera of an imaging system, including an image sensor, lidar sensor, internal lens groups, steerable mirror, external lens, and camera controller, in accordance with the disclosure.

FIG. 7 schematically illustrates another embodiment of the camera 700 that is an element of the imaging system 20 that is described with reference to FIG. 1, and includes an image sensor 702, internal lens group 704, steerable mirror 706, external lens 708, and a camera controller 710. The camera 700 also includes a lidar device 711 including a laser transmitter 712 and a receiver 713. The camera controller 710 is operatively connected to the image sensor 702, the steerable mirror 706, and the lidar device 711, and the external lens 708 is disposed to monitor a viewable region, which is shown as viewable region 410.

The controller 710 is arranged to control the steerable mirror 706 to a first setting 706-1 to project the viewable region 410 onto the image sensor 702, and control the image sensor 702 to capture an image file of a field of view (FOV) that is associated with the viewable region 410 that is projected onto the image sensor 702 via the internal lens group 704. The controller 710 is arranged to control the steerable mirror 706 to a second setting 706-2 and activate the laser transmitter 712 to project a laser beam into the viewable region 410 via the steerable mirror 706, and capture via the receiver 713 a reflected image of the laser beam that is associated with the viewable region 410 via the steerable mirror 706. As such the laser transmitter 712 and receiver 713 and the image sensor 702 share a common optical path 715 for monitoring the viewable region 410, wherein the optical path 715 is defined by the steerable mirror 706 and the external lens 708. In this manner, the controller 710 multiplexes the use of the optical path 715 between the image sensor 702 and the lidar device 711.

By multiplexing the use of the optical path 715 between the image sensor 702 and the lidar device 711, alignment of the optical data from the image sensor 702 and the laser data from the lidar device 711 is facilitated, which facilitates sensor fusion. The multiplexed use of the optical path 715 also facilitates removal of parallax effect and data misalignment that otherwise may occur. The multiplexed use of the optical path 715 also reduces or eliminates lidar and optical sensor co-calibration that occurs on a vehicle assembly line.

The imaging system 20 described herein may reduce or eliminate the need to transfer and process image data that has limited relevance to present vehicle operation, thus lowering hardware requirements, material, power consumption and complexity without sacrificing system performance, and may reduce or eliminate data transfer and processing bottlenecks for high resolution images, thus facilitating or improving operation of vehicle equipped with ADAS without sacrificing system performance.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks. The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An image processing device, comprising:
   an image sensor, an internal lens, a steerable mirror, an external lens, a lidar device, and a controller;
   wherein the lidar device includes a laser transmitter and a receiver;
   wherein the laser transmitter is arranged to project a laser beam onto the steerable mirror;
   wherein the controller is operatively connected to the image sensor, the lidar device, and the steerable mirror;
   wherein the external lens is disposed to monitor a viewable region;
   wherein the steerable mirror is interposed between the internal lens and the external lens;
   wherein the steerable mirror is arranged to project the viewable region from the external lens onto the image sensor via the internal lens;
   wherein the controller is arranged to control the steerable mirror to a first setting to project the viewable region onto the image sensor, and control the image sensor to capture an image file of a field of view (FOV) that is associated with the viewable region that is projected onto the image sensor via the internal lens; and wherein the controller is arranged to control the steerable mirror to a second setting, activate the laser transmitter to project the laser beam into the viewable region via the steerable mirror, and capture via the receiver a reflected image of the laser beam associated with the viewable region via the steerable mirror.

2. The image processing device of claim 1, wherein the laser transmitter and the image sensor share a common optical outlet path for monitoring the viewable region that is defined by the steerable mirror and the external lens.

3. The image processing device of claim 2, wherein the controller multiplexes the use of the optical outlet path between the image sensor and the lidar device.

4. The image processing device of claim 1, further comprising the controller being arranged to control the steerable mirror to modify the viewable region that is projected onto the image sensor via the internal lens.

5. The image processing device of claim 4, wherein the controller arranged to control the steerable mirror to modify the viewable region that is projected onto the image sensor comprises the controller arranged to control the steerable mirror to tilt the viewable region that is projected onto the image sensor.

6. The image processing device of claim 4, wherein the controller arranged to control the steerable mirror to modify the viewable region that is projected onto the image sensor comprises the controller arranged to control the steerable mirror to pan the viewable region that is projected onto the image sensor.

7. The image processing device of claim 1, wherein the steerable mirror is controllably deformable.

8. The image processing device of claim 7, wherein the controller arranged to control the steerable mirror to modify the viewable region that is projected onto the image sensor comprises the controller arranged to deform the steerable mirror to zoom a portion of the viewable region that is projected onto the image sensor.

9. The image processing device of claim 1, wherein the image processing device is disposed on a vehicle; and wherein the external lens is disposed to view a region surrounding the vehicle and associated with a direction of travel of the vehicle.

10. The image processing device of claim 1, further comprising wherein the controller is arranged to control the steerable mirror to project a portion of the viewable region onto the image sensor.

11. The image processing device of claim 1, wherein the steerable mirror comprises a MEMS mirror.

12. The image processing device of claim 1, further comprising wherein the controller is arranged to control the steerable mirror to project a portion of the viewable region onto the receiver of the lidar device.

13. The image processing device of claim 1, further comprising the controller being arranged to control the steerable mirror to modify the viewable region that is projected onto the receiver of the lidar device via the internal lens.

14. The image processing device of claim 13, wherein the controller arranged to control the steerable mirror to modify the viewable region that is projected onto the receiver of the lidar device comprises the controller arranged to control the steerable mirror to tilt the viewable region that is projected onto the receiver of the lidar device.

15. The image processing device of claim 13, wherein the controller arranged to control the steerable mirror to modify the viewable region that is projected onto the receiver of the lidar device comprises the controller arranged to control the steerable mirror to pan the viewable region that is projected onto the receiver of the lidar device.

16. The image processing device of claim 7, wherein the controller arranged to control the steerable mirror to modify the viewable region that is projected onto the receiver of the lidar device comprises the controller arranged to deform the steerable mirror to zoom a portion of the viewable region that is projected onto the receiver of the lidar device.

17. The image processing device of claim 1, wherein the steerable mirror comprises a micro-opto-electromechanical system (MOEMS) mirror.

18. The image processing device of claim 3, wherein the controller multiplexes the use of the optical outlet path between the image sensor and the lidar device to facilitate alignment of the optical data from the image sensor and the laser data from the lidar device.

* * * * *